US012413306B2

(12) United States Patent
Takata et al.

(10) Patent No.: US 12,413,306 B2
(45) Date of Patent: Sep. 9, 2025

(54) MANAGEMENT SYSTEM, MANAGEMENT APPARATUS, AND MANAGEMENT METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 18/222,253

(22) Filed: Jul. 14, 2023

(65) Prior Publication Data

US 2024/0097785 A1 Mar. 21, 2024

(30) Foreign Application Priority Data

Sep. 20, 2022 (JP) ................................ 2022-149251

(51) Int. Cl.
H04B 10/11 (2013.01)
H04B 10/079 (2013.01)

(52) U.S. Cl.
CPC ....... H04B 10/11 (2013.01); H04B 10/07953 (2013.01)

(58) Field of Classification Search
CPC .................. H04B 10/07953; H04B 10/11
See application file for complete search history.

(56) References Cited

U.S. PATENT DOCUMENTS 6,731,878 B1 * 5/2004 Britz ................... H04J 14/0305
398/118
6,934,477 B2 * 8/2005 Willebrand ........ H04Q 11/0062
398/103

(Continued)

FOREIGN PATENT DOCUMENTS

| JP | 2004-323119 A | 11/2004 |
| JP | 2016-033538 A | 3/2016 |
| WO | 2019/142236 A1 | 7/2019 |

OTHER PUBLICATIONS

Abdelbaset S. Hamza et al.,"Classification Framework for Free Space Optical Communication Links and Systems," May 31, 2019, IEEE Communications Surveys & Tutorials, vol. 21, No. 2, Second Quarter 2019, vol. 33, No. 1, Jan. 2022, pp. 1346-1374.*
Zabih Ghassemlooy et al.,"Emerging Optical Wireless Communications—Advances and Challenges,"Aug. 17, 2015,IEEE Journal On Selected Areas In Communications, vol. 33, No. 9, Sep. 2015,pp. 1738-1742.*

(Continued)

Primary Examiner — Omar S Ismail
(74) Attorney, Agent, or Firm — Sughrue Mion, PLLC

(57) ABSTRACT

A management system for managing an upper free-space optical communication apparatus and a lower free-space optical communication apparatus that carry out free-space optical communication in an up-and-down direction is provided, the management system including at least one processor, the at least one processor carrying out: an acquisition process of acquiring a first index that indicates a quality of a first upward light signal received by the upper free-space optical communication apparatus; and a determination process of determining a possibility of contamination of a light sending and receiving window of the lower free-space optical communication apparatus in accordance with the first index, the lower free-space optical communication apparatus being configured to send and receive a light signal of the free-space optical communication through the light sending and receiving window.

18 Claims, 10 Drawing Sheets

(56) References Cited

U.S. PATENT DOCUMENTS

| | | | | |
|---|---|---|---|---|
| 9,774,395 | B1* | 9/2017 | Goorjian | H04B 10/118 |
| 9,954,613 | B1* | 4/2018 | Goorjian | H04B 10/118 |
| 10,547,382 | B2* | 1/2020 | Feng | H04B 10/564 |
| 11,115,119 | B1* | 9/2021 | Lee | H04B 7/18519 |
| 11,647,315 | B2* | 5/2023 | Fujita | H04Q 11/0005 |
| | | | | 398/45 |
| 11,722,236 | B1* | 8/2023 | Clarke | H04J 14/06 |
| | | | | 398/48 |
| 2007/0053696 | A1* | 3/2007 | Bloom | H04B 10/112 |
| | | | | 398/141 |
| 2008/0189422 | A1* | 8/2008 | Naoe | H04L 69/325 |
| | | | | 709/227 |
| 2017/0302377 | A1* | 10/2017 | Boroson | H04B 10/5161 |
| 2018/0097567 | A1* | 4/2018 | LeGrange | H04B 10/293 |

OTHER PUBLICATIONS

Alberto Carrasco-Casado et al.,"Free-space optical links for space communication networks," Dec. 24, 2020, Instrumentation and Methods for Astrophysics ,astro-ph-arXiv:2012.13166,pp. 2-18.*

Abdelmoula Bekkali,"New Generation Free-Space Optical Communication Systems With Advanced Optical Beam Stabilizer," Mar. 2, 2022, Journal Of Lightwave Technology, vol. 40, No. 5, Mar. 1, 2022,pp. 1509-1516.*

Vincent W. S. Chan,"Free-Space Optical Communications," Aug. 17, 2006,Journal Of Lightwave Technology, vol. 24, No. 12, Dec. 2006,pp. 4750-4760.*

Sunny Kedia et al.,"Total Internal Reflection-Based Free Space Optical Communication System," Sep. 29, 2015,Journal Of Microelectromechanical Systems, vol. 24, No. 5, Oct. 2015,pp. 1632-1640.*

* cited by examiner

FIG. 1
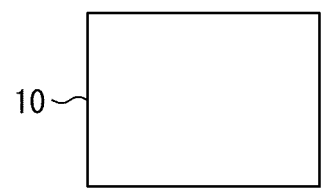
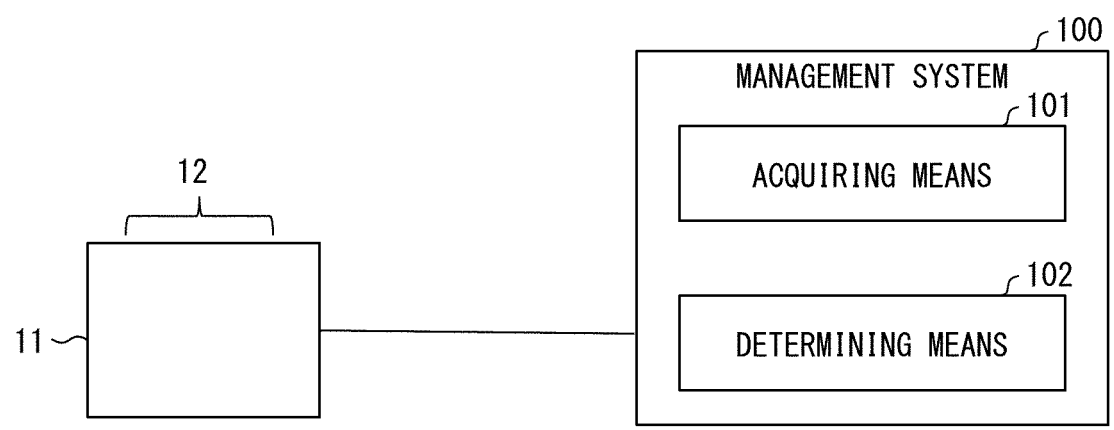

FIG. 3
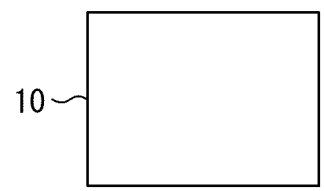
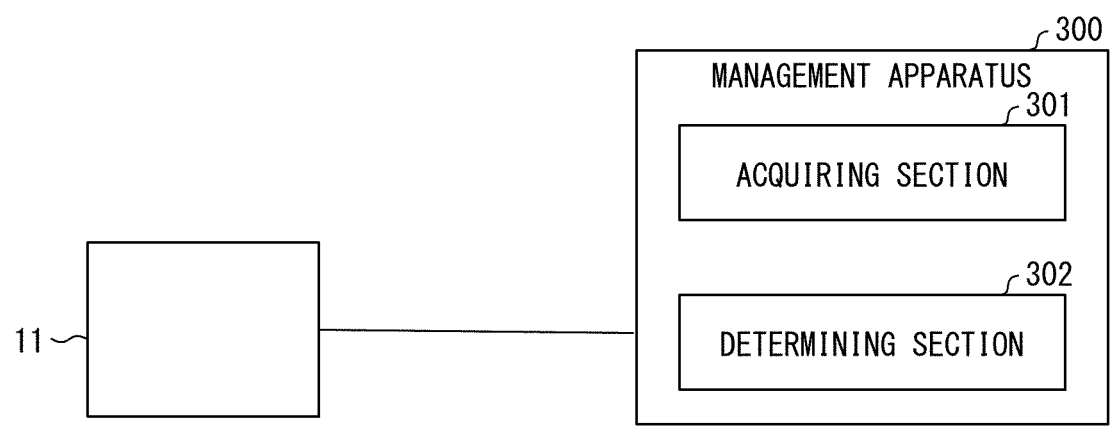

FIG. 4
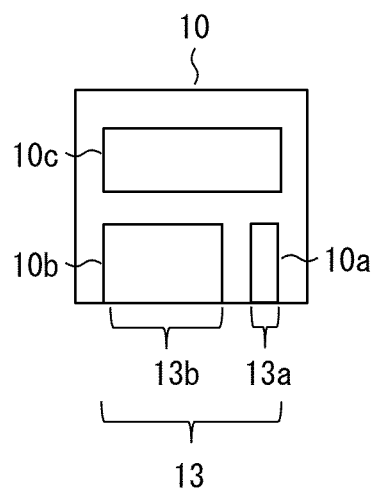
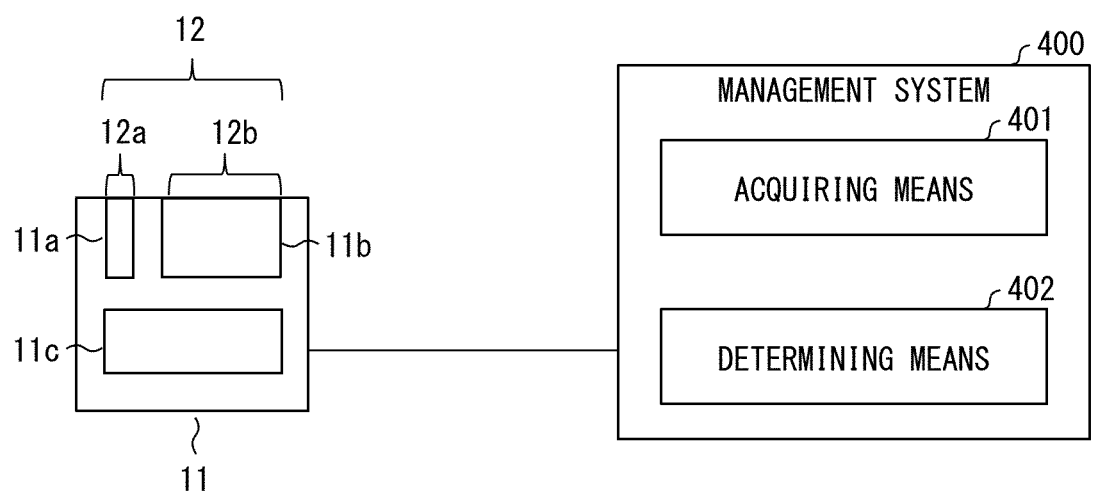

MANAGEMENT SYSTEM, MANAGEMENT APPARATUS, AND MANAGEMENT METHOD

This Nonprovisional application claims priority under 35 U.S.C. § 119 on Patent Application No. 2022-149251 filed in Japan on Sep. 20, 2022, the entire contents of which are hereby incorporated by reference.

TECHNICAL FIELD

The present invention relates to a management system, a management apparatus, and a management method.

BACKGROUND ART

Patent Literature 1 indicates that in an optical communication system in which an optical fiber is used in a transmission path, (i) the time-dependent deterioration of an electrical-to-optical converter causes a reduction in the amount of light output and therefore can lead to occurrence of a communication failure and (ii) the timing of maintenance performed for prevention of such a communication failure is estimated in accordance with the time-dependent change in the value of a signal obtained by subjecting a light signal to an optical-to-electrical conversion.

CITATION LIST

Patent Literature

Patent Literature 1

PCT International Publication No. WO2019/142236

SUMMARY OF INVENTION

Technical Problem

The technique disclosed in Patent Literature 1 is the technique of determining the time-dependent deterioration of an electrical-to-optical converter in an optical communication system in which an optical fiber is used in a transmission path.

In this respect, the inventors of the present invention have found the following on the basis of their unique idea: in a case where free-space optical communication in which an optical fiber is not used in a transmission path is used in an up-and-down direction, the light sending and receiving window of a lower free-space optical communication apparatus is contaminated due to the accumulation of dust or the like and/or the accretion of bird excrement or the like, and therefore the communication can deteriorate. In view of this, determining the possibility of contamination of the light sending and receiving window of the lower free-space optical communication apparatus is useful in determining, for example, whether maintenance is needed.

A technique for solving such a problem has not been known before.

An example object of the present invention is to provide a management system, a management apparatus, and a management method for determining the possibility of contamination of the light sending and receiving window of a lower free-space optical communication apparatus in the technique for free-space optical communication in an up-and-down direction.

Solution to Problem

An example aspect of a management system of the present invention is a management system for managing an upper free-space optical communication apparatus and a lower free-space optical communication apparatus that carry out free-space optical communication in an up-and-down direction, the management system including at least one processor, the at least one processor carrying out: an acquisition process of acquiring a first index that indicates a quality of a first upward light signal received by the upper free-space optical communication apparatus; and a determination process of determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

An example aspect of a management apparatus of the present invention includes at least one processor, the at least one processor carrying out: an acquisition process of acquiring a first index that indicates a quality of a first upward light signal received by the upper free-space optical communication apparatus; and a determination process of determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

An example aspect of a management method of the present invention is a management method for managing an upper free-space optical communication apparatus and a lower free-space optical communication apparatus that carry out free-space optical communication in an up-and-down direction, the management method including: acquiring a first index that indicates a quality of a first upward light signal received by the upper free-space optical communication apparatus; and determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

Advantageous Effects of Invention

It is possible to determine the possibility of contamination of the light sending and receiving window of a lower free-space optical communication apparatus in the technique of free-space optical communication in an up-and-down direction.

BRIEF DESCRIPTION OF DRAWINGS

FIG. 1 is a block diagram of an example configuration of a management system in accordance with a first example embodiment.

FIG. 3 is a block diagram of an example configuration of a management apparatus in accordance with the first example embodiment.

FIG. 4 is a block diagram of an example configuration of a management system in accordance with a second example embodiment.

EXAMPLE EMBODIMENTS

First Example Embodiment (Management System)

Figure 2:
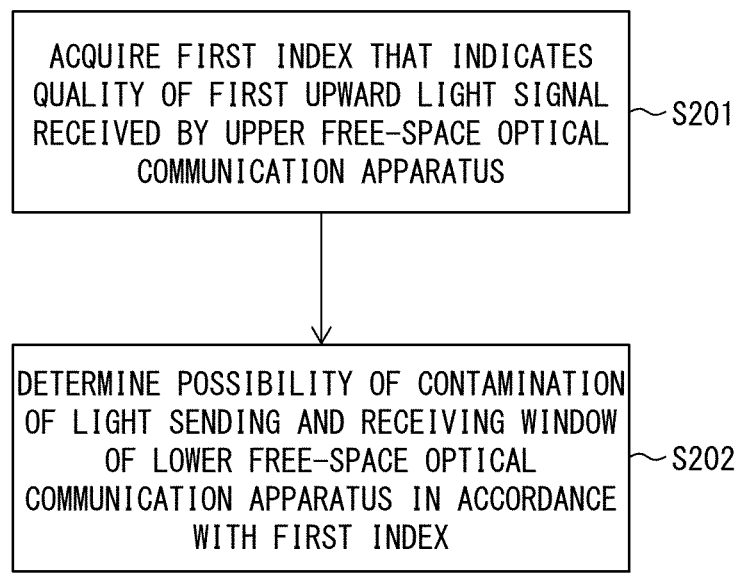
FIG. 2 is a flowchart of an example operation of the management system in accordance with the first example embodiment.

The following description will discuss a management system 100 in accordance with a first example embodiment of the present invention with reference to the drawings. The management system 100 is a system for managing an upper free-space optical communication apparatus 10 and a lower free-space optical communication apparatus 11 that carry out free-space optical communication in an up-and-down direction. Free-space optical communication is the communication that is carried out with use of light propagating through space. Examples of the light used in the free-space optical communication can encompass a millimeter wave, a submillimeter wave, infrared light, visible light, and ultraviolet light. The up-and-down direction refers to a substantially vertical direction, but may be at an angle of not more than 45°, not more than 30°, not more than 15°, or not more than 5° with respect to the vertical direction.

Examples of the use of the free-space optical communication in the up-and-down direction can encompass, but not particularly limited to, communication between floor levels that are different in height from each other, the communication being carried out in an elevator or in a tall building, such as a tower.

The management system 100 "managing" the upper free-space optical communication apparatus 10 and the lower free-space optical communication apparatus 11 includes: the management system 100 monitoring the statuses of the upper free-space optical communication apparatus 10 and the lower free-space optical communication apparatus 11 to maintain the upper free-space optical communication apparatus 10 and the lower free-space optical communication apparatus 11; and the management system 100 providing a notification or the like that is necessary for the maintenance.

FIG. 1 is a functional block diagram of an example configuration of the management system 100 in accordance with the first example embodiment of the present invention. In FIG. 1, each of the blocks indicates a function-by-function component. Accordingly, the blocks illustrated in FIG. 1 may be implemented in a single apparatus, or may be implemented in more than one apparatus. Further, some or all of the blocks may be implemented as functions with use of the cloud or the like. Alternatively, some of all of the blocks may be included in the upper free-space optical communication apparatus 10 or the lower free-space optical communication apparatus 11. The management system 100 includes an acquiring means 101 and a determining means 102.

The upper free-space optical communication apparatus receives an upward light signal from the lower free-space optical communication apparatus 11 and sends a downward light signal to the lower free-space optical communication apparatus 11. The lower free-space optical communication apparatus 11 receives a downward light signal from the upper free-space optical communication apparatus 10 and sends an upward light signal to the upper free-space optical communication apparatus 10. This allows free-space optical communication between the upper free-space optical communication apparatus 10 and the lower free-space optical communication apparatus 11 in the up-and-down direction.

The lower free-space optical communication apparatus 11 includes a light sending and receiving window 12 for sending and receiving a light signal of free-space optical communication. In other words, the lower free-space optical communication apparatus 11 sends and receives a light signal of free-space optical communication through the light sending and receiving window 12. The light sending and receiving window 12 includes an optical part that allows a light signal of free-space optical communication to pass through, such as a lens or a filter. Although not illustrated, a light sending and receiving window is included also in the upper free-space optical communication apparatus 10 for sending and receiving a light signal of free-space optical communication.

In the example illustrated in FIG. 1, the management system 100 is connected to the lower free-space optical communication apparatus 11. However, the present example embodiment is not limited to this, but the management system 100 may be connected to the upper free-space optical communication apparatus 10. This is because the upper free-space optical communication apparatus 10 and the lower free-space optical communication apparatus 11 are capable of free-space optical communication in the up-and-down direction therebetween, and it is therefore possible to acquire information of one of the apparatuses via the other. Further, the management system 100 may be connected to both the upper free-space optical communication apparatus 10 and the lower free-space optical communication apparatus 11.

The acquiring means 101 acquires a first index that indicates the quality of a first upward light signal received by the upper free-space optical communication apparatus 10. Examples of the first index encompass: the received light intensity of the first upward light signal at the upper free-space optical communication apparatus 10; and the resending rate of the first upward light signal at the lower free-space optical communication apparatus 11.

The determining means 102 determines the possibility of contamination of the light sending and receiving window 12 of the lower free-space optical communication apparatus 11 in accordance with the first index acquired by the acquiring means 101.

The contamination of the light sending and receiving window 12 of the lower free-space optical communication apparatus 11 refers to the accumulation of dust and/or the accretion of bird excrement or the like on the light sending and receiving window 12. For free-space optical communication in the up-and-down direction, the upper free-space optical communication apparatus 10 and the lower free-space optical communication apparatus 11 are disposed so as to have a space therebetween, and the light sending and receiving window 12 of the lower free-space optical communication apparatus 11 faces upward. Accordingly, in outdoor locations, there is the possibility of accumulation of, for example, dust and/or bird excrement, and even in indoor locations, there is the possibility of accumulation of dust. The contamination of the light sending and receiving window 12 has an effect on both the downward light signal sent from the upper free-space optical communication apparatus 10 to the lower free-space optical communication apparatus 11 and the upward light signal sent from the lower free-space optical communication apparatus 11 to the upper free-space optical communication apparatus 10, and therefore can cause a communication failure.

In this respect, according to the present example embodiment, the determining means 102 is capable of detecting contamination of the light sending and receiving window 12 of the lower free-space optical communication apparatus 11 with high sensitivity, by determining the possibility of the contamination of the light sending and receiving window 12 of the lower free-space optical communication apparatus 11 in accordance with the first index that indicates the quality of the first upward light signal received by the upper free-space optical communication apparatus 10. The reason for this is as follows.

The light sending and receiving window 12 is composed of a light sending section window for sending of light and a light receiving section window for reception of light. Typically, the area of the light receiving section window is greater than the area of the light sending section window in the light sending and receiving window 12. Accordingly, foreign substances such as dust and bird excrement have a greater effect on the sending of light, the corresponding window of which has the smaller area. Thus, the contamination of the light sending and receiving window 12 has a greater effect on the upward light signal sent from the lower free-space optical communication apparatus 11 to the upper free-space optical communication apparatus 10 than on the downward light signal sent from the upper free-space optical communication apparatus 10 to the lower free-space optical communication apparatus 11. For this reason, the detection in accordance with the first index that indicates the quality of the first upward light signal received by the upper free-space optical communication apparatus 10 allows detection of the contamination of the light sending and receiving window 12 of the lower free-space optical communication apparatus 11 with high sensitivity.

The determining means 102 can determine that the degree of contamination of the light sending and receiving window 12 is greater than a degree that requires maintenance when, for example, the first index acquired by the acquiring means 101 is greater than a predetermined threshold.

(Management Method)

The operation (management method) of the management system in accordance with the first example embodiment will be described with use of the drawings. FIG. 2 is a flowchart of an example operation of the management system 100.

In step S201, the acquiring means 101 acquires the first index that indicates the quality of the first upward light signal received by the upper free-space optical communication apparatus 10.

In step S202, the determining means 102 determines the possibility of contamination of the light sending and receiving window 12 of the lower free-space optical communication apparatus 11 in accordance with the first index.

(Management Apparatus)

FIG. 3 is a block diagram of an example configuration of a management apparatus 300 in accordance with the first example embodiment of the present invention. An acquiring section 301 has a function equivalent to the function of the acquiring means 101, and acquires the first index that indicates the quality of the first upward light signal received by the upper free-space optical communication apparatus 10. A determining section 302 has a function equivalent to the function of the determining means 102, and determines the possibility of contamination of the light sending and receiving window 12 of the lower free-space optical communication apparatus 11 in accordance with the first index.

The acquiring section 301 and the determining section 302 may be computer equipment in which a processor executes a program stored in a memory so that a process is carried out. Each of the acquiring section 301 and the determining section 302 is partially or wholly included in the upper free-space optical communication apparatus 10 or the lower free-space optical communication apparatus 11, or may be computer equipment that communicates with the upper free-space optical communication apparatus 10 or the lower free-space optical communication apparatus 11. For example, the acquiring section 301 or the determining section 302 may be provided by a single piece of computer equipment, or may be provided by a computer equipment group that operates through collaboration among pieces of computer equipment or by a server equipment group that operates through collaboration among pieces of server equipment. With the management apparatus 300, it is possible to obtain an example advantage equivalent to the example advantage of the management system 100.

Second Example Embodiment

A management system 400 in accordance with a second example embodiment will be described. The same reference sign is assigned to a component that has the same function as the component described in the first example embodiment, and the description thereof is omitted.

FIG. 4 is a block diagram of an example configuration of the management system 400 in accordance with the second example embodiment of the present invention. In FIG. 4, each of the blocks indicates a function-by-function component. Accordingly, the blocks illustrated in FIG. 4 may be implemented in a single apparatus, or may be implemented in more than one apparatus. Further, some or all of the blocks may be implemented as functions with use of the cloud or the like. As illustrated in FIG. 4, the management system 400 includes an acquiring means 401 and a determining means 402.

An upper free-space optical communication apparatus 10 includes a light sending section 10a, a light receiving section 10b, and a communication control section 10c. The light sending section 10a sends a downward light signal through a light sending section window 13a. The light receiving section 10b receives an upward light signal through a light receiving section window 13b. A light sending and receiving window 13 is composed of the light sending section window 13a and the light receiving section window 13b. The communication control section 10c controls the light sending section 10a and the light receiving section 10b to carry out free-space optical communication.

A lower free-space optical communication apparatus 11 includes a light sending section 11a, a light receiving section 11b, and a communication control section 11c. The light sending section 11a sends an upward light signal through a light sending section window 12a. The light receiving section 11b receives a downward light signal through a light receiving section window 12b. A light sending and receiving window 12 is composed of the light sending section window 12a and the light receiving section window 12b. The communication control section 11c controls the light sending section 11a and the light receiving section 11b to carry out free-space optical communication.

Figure 5:
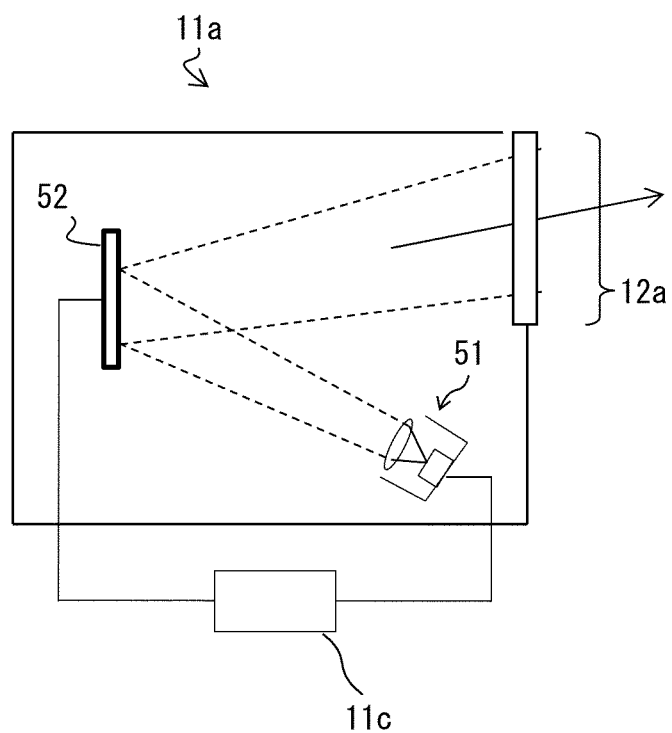
FIG. 5 is a diagram of an example of a detailed structure of a light sending section.

FIG. 5 is a diagram of an example of a detailed structure of the light sending section 11a of the lower free-space optical communication apparatus 11. The light sending section 11a includes a light emitting section 51 and a light modulator 52. The light emitting section 51 and the light modulator 52 is controlled by the communication control section 11c. The light sending section window 12a through which a light signal to be sent passes is provided with a filter 53.

The light emitting section 51 includes a well-known light emitting element, and can include a lens or the like. Light emitted from the light emitting section 51 falls on the light modulator 52. Activation of the light emitting section 51 is controlled by the communication control section 11c.

Light from the light emitting section 51 falls on the light modulator 52, and the light modulator 52 then produces light having desired conditions and emits the produced light. The desired conditions can be, for example, a desired wavelength, a desired light intensity, and a desired angle. To generate light having the desired conditions, the light modulator 52 is controlled by the communication control section 11c. The light emitted from the light modulator 52 passes through the light sending section window 12a and travels to the light receiving section 10b of the upper free-space optical communication apparatus 10.

The light sending section 10a of the upper free-space optical communication apparatus 10 have a configuration equivalent to the configuration of the light sending section 11a of the lower free-space optical communication apparatus 11.

A configuration described in the example illustrated in FIG. 5 is that the light sending section 11a includes the light modulator 52. However, the present example embodiment is not limited to this configuration, but may have the configuration in which the direction of a light signal to be sent is mechanically adjusted. As the configuration of mechanically adjusting the direction of a light signal to be sent, a known optical technique can be used. Examples of the known optical technique can include: the configuration of including a mirror instead of the light modulator 52 to change the orientation of the mirror via an electrically-operated stage or the like; the configuration of controlling the inclination of the entire light sending section 11a via a gimbal or the like; and the configuration of moving the light emitting section 51 via an electrically-operated stage or the like.

Figure 6:
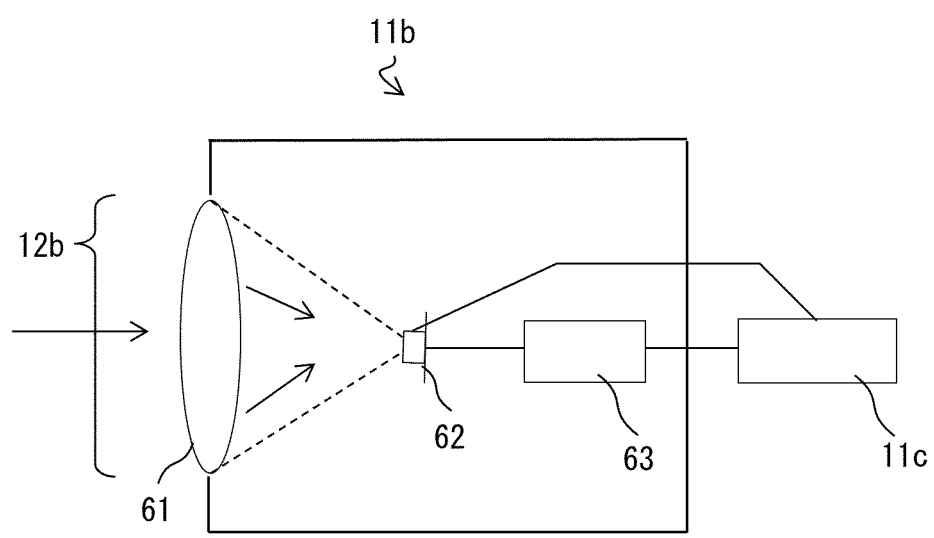
FIG. 6 is a diagram of an example of a detailed structure of a light receiving section.

FIG. 6 is a diagram of an example of a detailed structure of the light receiving section 11b of the lower free-space optical communication apparatus 11. The light receiving section 11b includes a condenser lens 61, a light receiving element 62, and a receiving circuit 63. A light signal emitted from the light sending section 10a of the upper free-space optical communication apparatus 10 is concentrated by the condenser lens 61, which is provided in the light receiving section window 12b, to be received by the light receiving element 62, and then undergoes signal processing in the receiving circuit 63.

The communication control section 11c determines whether proper reception is made with respect to the light signal having been undergone the signal processing in the receiving circuit 63, and may cause the light sending section 11a to send an acknowledgement light signal which indicates the proper reception of the light signal. Further, the communication control section 11c may acquire, from the light receiving element 62, the received light intensity of the light signal.

The light receiving section 10b of the upper free-space optical communication apparatus 10 has a configuration equivalent to the configuration of the light receiving section 11b of the lower free-space optical communication apparatus 11.

Figure 7:
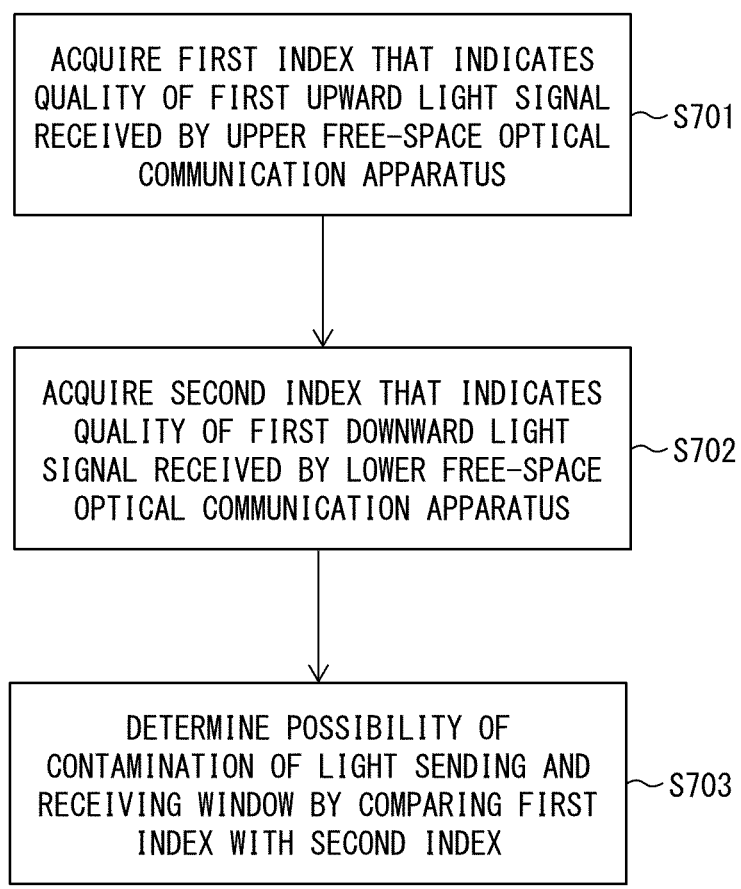
FIG. 7 is a flowchart of an example operation of the management system in accordance with the second example embodiment.

FIG. 7 is a flowchart of an example operation of the management system 400. The management system 400 may determine the possibility of contamination of the light sending and receiving window 12 in accordance with a first index, like the management system 100 in the first example embodiment, or may determine the possibility of contamination of the light sending and receiving window 12 in accordance with the first index and a second index.

In step S701, like the acquiring means 101 in the first example embodiment, the acquiring means 401 acquires the first index that indicates the quality of the first upward light signal received by the upper free-space optical communication apparatus 10. Examples of the first index encompass: the received light intensity of the first upward light signal at the upper free-space optical communication apparatus 10; and the resending rate of the first upward light signal at the lower free-space optical communication apparatus 11. The communication control section 11c of the lower free-space optical communication apparatus 11 may resend the first upward light signal depending on whether there is the acknowledgement light signal as to the first upward light signal and also calculate a resending rate to provide the acquiring means 401 with the resending rate.

In step S702, the acquiring means 401 acquires the second index that indicates the quality of the first downward light signal received by the lower free-space optical communication apparatus 11. Examples of the second index encompass: the received light intensity of the first downward light signal at the lower free-space optical communication apparatus 11; and the resending rate of the first downward light signal at the upper free-space optical communication apparatus 10.

In step S703, the determining means 402 determines the possibility of contamination of the light sending and receiving window by comparing the first index acquired in step S701 with the second index acquired in step S702.

For example, in a case where the determining means 402 calculates the ratio between the first index and the second index and the ratio is greater than a predetermined threshold, the determining means 402 can determine that the degree of contamination of the light sending and receiving window 12 is greater than a degree that requires maintenance. For example, in a case where the determining means 402 calculates the difference between the first index and the second index and the difference is greater than a predetermined threshold, the determining means 402 can determine that the degree of contamination of the light sending and receiving window 12 is greater than the degree that requires maintenance. Alternatively, a calculating formula other than a ratio and a difference may be used.

As above, the contamination of the light sending and receiving window 12 has a greater effect on the upward light signal sent from the lower free-space optical communication apparatus 11 to the upper free-space optical communication apparatus 10 than on the downward light signal sent from the upper free-space optical communication apparatus 10 to the lower free-space optical communication apparatus 11. In contrast, as to the effect on a light signal due to a factor other than the contamination of the light sending and receiving window 12, it is estimated that the degree of such an effect on the downward light signal sent from the upper free-space optical communication apparatus 10 to the lower free-space optical communication apparatus 11 is the same as that on the upward light signal sent from the lower free-space optical communication apparatus 11 to the upper free-space optical communication apparatus 10. Thus, by comparing the first index that indicates the quality of the first upward light signal received by the upper free-space optical communication apparatus 10 with the second index that indicates the quality of the first downward light signal received by the lower free-space optical communication apparatus 11, it is possible to remove the effect on a light signal due to a factor other than the contamination of the light sending and receiving window 12 to accurately detect the contamination of the light sending and receiving window 12 of the lower free-space optical communication apparatus 11.

In the above description, the second example embodiment as the management system 400 has been described. The management system 400 in accordance with the second example embodiment may be incorporated into a single apparatus to form a management apparatus.

Third Example Embodiment

A management system 800 in accordance with a third example embodiment will be described. The same reference sign is assigned to a component that has the same function as the component described in the first or second example embodiment, and the description thereof is omitted.

Figure 8:
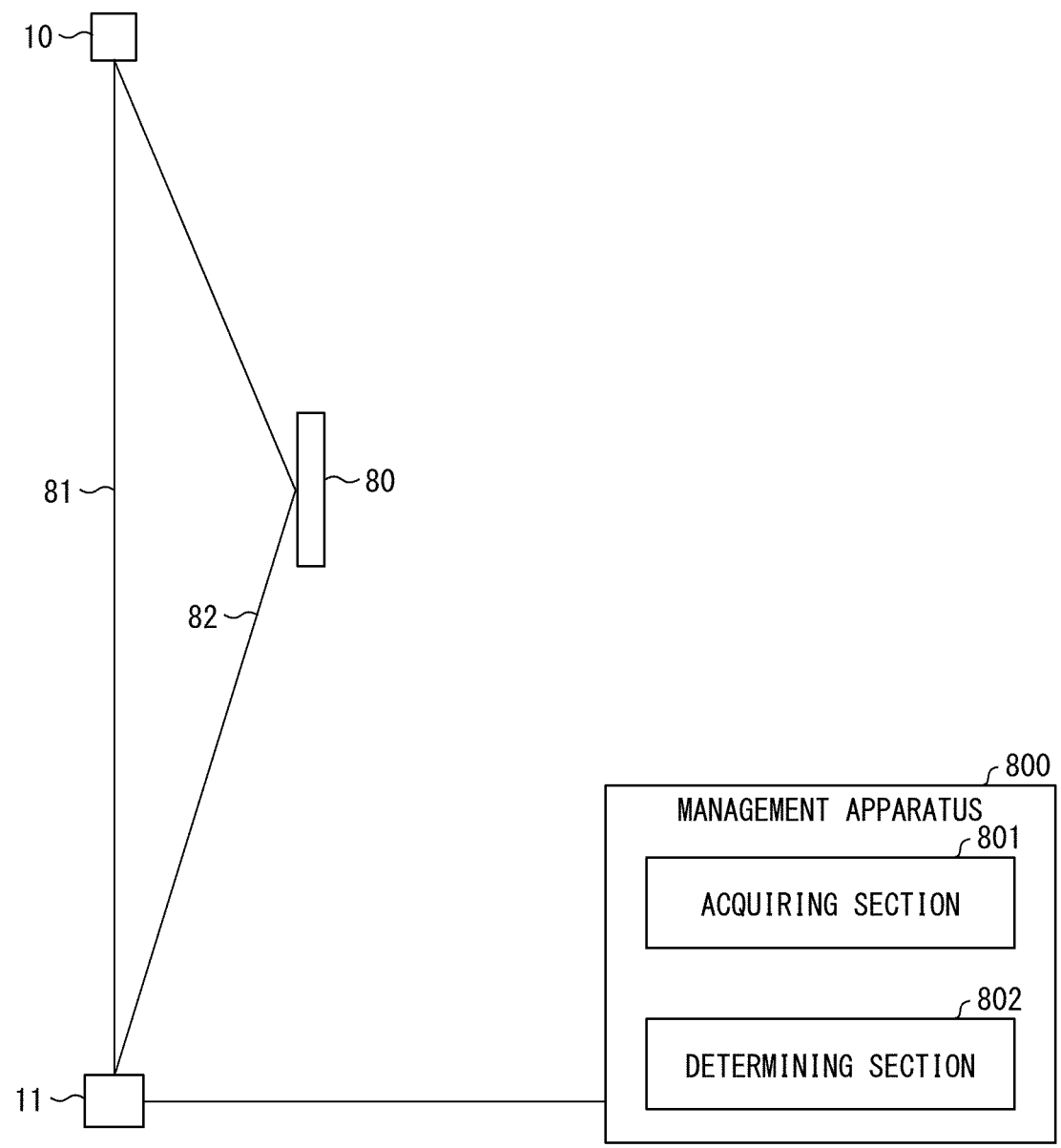
FIG. 8 is a block diagram of an example configuration of a management system in accordance with a third example embodiment.

FIG. 8 is a block diagram of an example configuration of the management system 800 in accordance with the third example embodiment of the present invention. In FIG. 8, each of the blocks indicates a function-by-function component. Accordingly, the blocks illustrated in FIG. 8 may be implemented in a single apparatus, or may be implemented in more than one apparatus. Further, some or all of the blocks may be implemented as functions with use of the cloud or the like. As illustrated in FIG. 8, the management system 800 includes an acquiring means 801 and a determining means 802.

In the example illustrated in FIG. 8, as a downward light signal sent from an upper free-space optical communication apparatus 10 to an lower free-space optical communication apparatus 11, there are a first downward light signal via a first path 81 and a second downward light signal via a second path 82. As an upward light signal sent from the lower free-space optical communication apparatus 11 to the upper free-space optical communication apparatus 10, there are a first upward light signal via the first path 81 and a second upward light signal via the second path 82. The second path 82 contains a point at which the second upward light signal and the second downward light signal are reflected by a mirror 80.

However, the present example embodiment is not limited to the configuration illustrated in FIG. 8, but only needs to be such that a light signal is capable of being sent and received via the first path and the second path different from the first path between the lower free-space optical communication apparatus 11 and the upper free-space optical communication apparatus 10. For example, a plurality of upper free-space optical communication apparatuses 10 including a first free-space optical communication apparatus 10 and a second free-space optical communication apparatus 10 are prepared, and the first path may be defined as a path connecting the first upper free-space optical communication apparatus 10 and the lower free-space optical communication apparatus 11, and the second path may be defined as a path connecting the second free-space optical communication apparatus 10 and the lower free-space optical communication apparatus 11.

Figure 9:
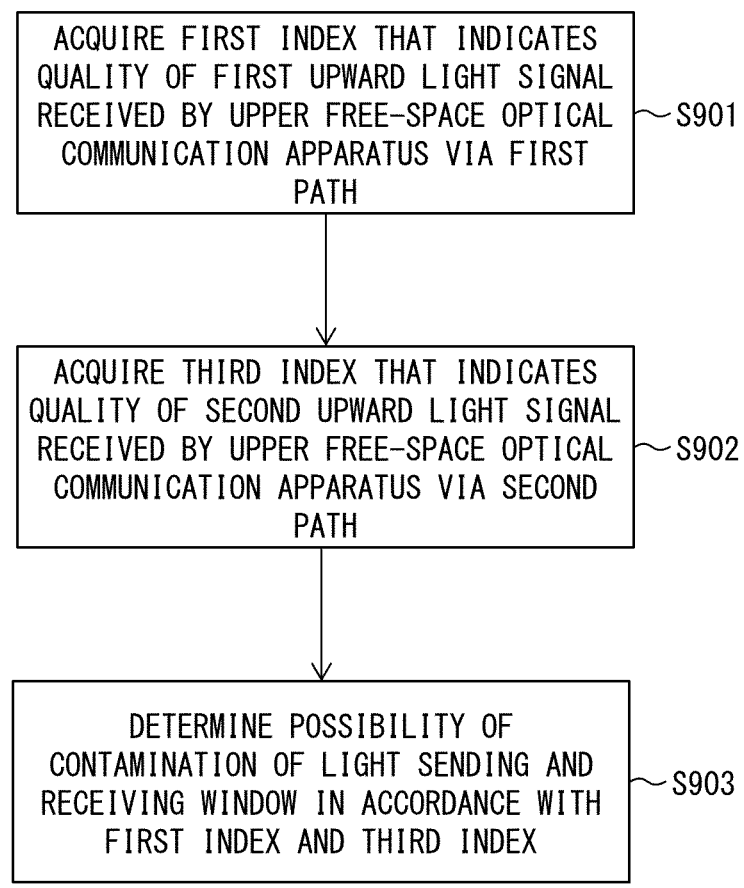
FIG. 9 is a flowchart of an example operation of the management system in accordance with the third example embodiment.

FIG. 9 is a flowchart of an example operation of the management system 800. In step S901, the acquiring means 801 acquires a first index that indicates the quality of the first upward light signal received by the upper free-space optical communication apparatus 10 via the first path 81, like the acquiring means 101 in the first example embodiment.

In step S902, the acquiring means 801 acquires a third index that indicates the quality of the second upward light signal received by the upper free-space optical communication apparatus 10 via the second path 82. Examples of the third index encompass: the received light intensity of the second upward light signal at the upper free-space optical communication apparatus 10; and the resending rate of the second upward light signal at the lower free-space optical communication apparatus 11.

In step S903, the determining means 802 determines the possibility of contamination of a light sending and receiving window in accordance with the first index acquired in step S901 and the third index acquired in step S902.

For example, in a case where the first index is greater than a predetermined threshold, and furthermore, a comparison between the third index and a predetermined threshold shows that the third index is greater than the predetermined threshold, the determining means 802 may determine that the degree of contamination of the light sending and receiving window 12 is greater than a degree that requires maintenance. In a case where the first index is greater than the predetermined threshold but the third index is not greater than the predetermined threshold, it can be estimated that a factor due to the path has a greater effect than the contamination of the light sending and receiving window 12 has. It is therefore possible to make a more accurate determination by determining, in a case where the first index is greater than the predetermined threshold and the third index is also greater than the predetermined threshold, that the degree of contamination of the light sending and receiving window 12 is greater than the degree that requires maintenance.

Figure 10:
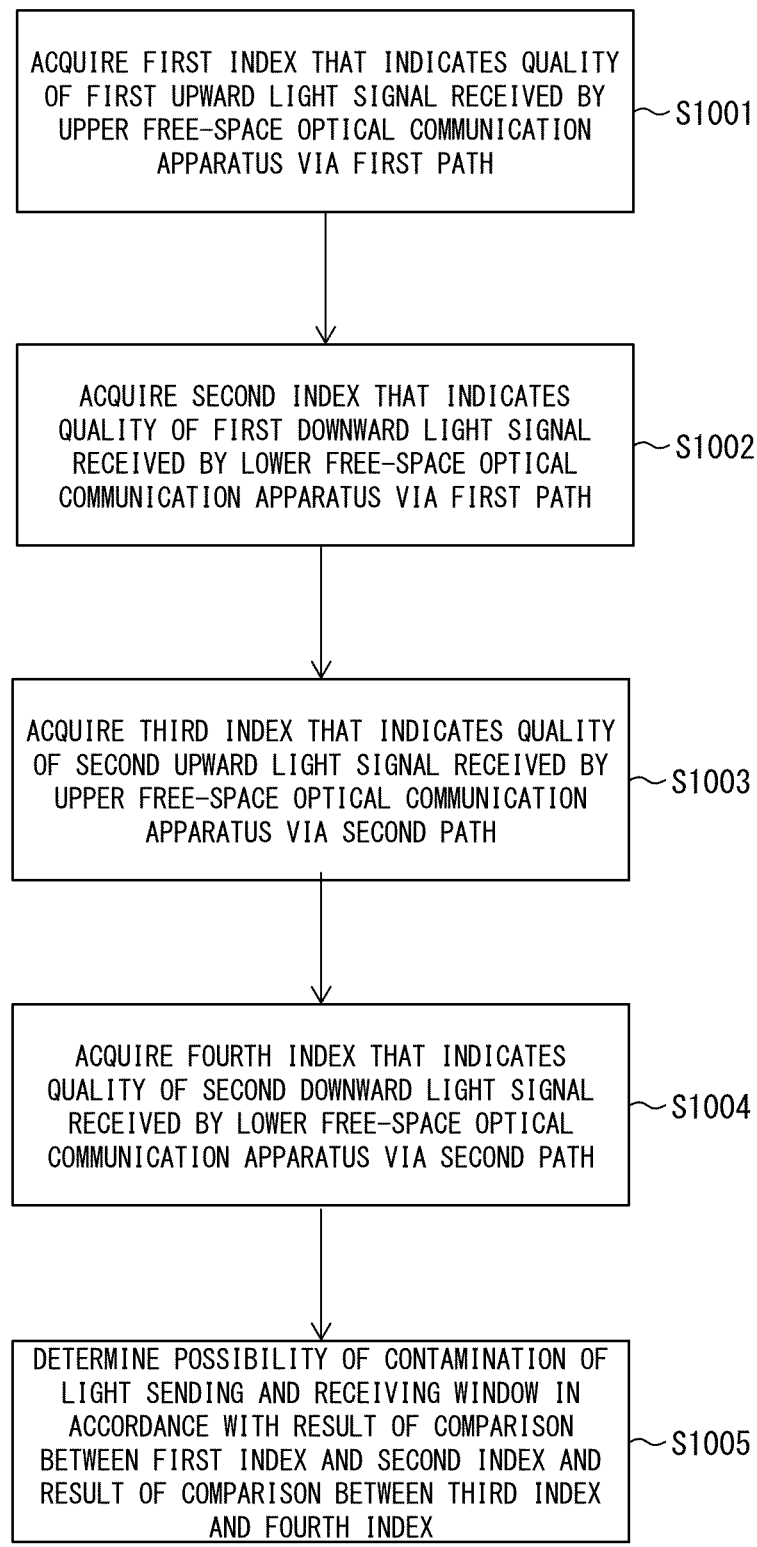
FIG. 10 is a flowchart of an example operation of the management system in accordance with the third example embodiment.

In addition, as in the second example embodiment, the determination may be made by further referring to the quality of the downward light signal. FIG. 10 is a flowchart of another example operation of the management system 800.

In step S1001, the acquiring means 801 acquires the first index that indicates the quality of the first upward light signal received by the upper free-space optical communication apparatus 10 via the first path 81, like the acquiring means 101 in the first example embodiment.

In step S1002, the acquiring means 801 acquires the second index that indicates the quality of the first downward light signal received by the lower free-space optical communication apparatus 11 via the first path 81, like the acquiring means 401 in the second example embodiment.

In step S1003, the acquiring means 801 acquires the third index that indicates the quality of the second upward light signal received by the upper free-space optical communication apparatus 10 via the second path 82.

In step S1004, the acquiring means 801 acquires a fourth index that indicates the quality of the second downward light signal received by the lower free-space optical communication apparatus 11 via the second path 82. Examples of the fourth index encompass: the received light intensity of the second downward light signal at the lower free-space optical communication apparatus 11; and the resending rate of the second downward light signal at the upper free-space optical communication apparatus 10.

In step S1005, the determining means 802 determines the possibility of the contamination of the light sending and receiving window in accordance with a result of comparison between the first index and the second index acquired respectively in step S1001 and step S1002 and a result of comparison between the third index and the fourth index acquired respectively in step S1003 and step S1004.

For example, in a case where the determining means 802 calculates the ratio between the first index and the second index and the ratio is greater than a predetermined threshold, and furthermore, the determining means 802 calculates the ratio between the third index and the fourth index and the ratio is greater than a predetermined threshold, the determining means 802 may determine that the degree of contamination of the light sending and receiving window 12 is greater than the degree that requires maintenance. In a case where the ratio between the first index and the second index is greater than the predetermined threshold but the ratio between the third index and the fourth index is not greater than the predetermined threshold, it can be estimated that a factor due to the path has a greater effect than the contamination of the light sending and receiving window 12 has. It is therefore possible to make a more accurate determination by determining, in a case where the ratio between the first index and the second index is greater than the predetermined threshold and the ratio between the third index and the fourth index is also greater than the predetermined threshold, that the degree of contamination of the light sending and receiving window 12 is greater than the degree that requires maintenance. Instead of a ratio, a difference and any other calculating formula may be used.

In the above description, the third example embodiment as the management system 800 has been described. The management system 800 in accordance with the third example embodiment may be incorporated into a single apparatus to form a management apparatus.

Fourth Example Embodiment

In the descriptions of the first to third example embodiments, indexes such as a received light intensity and a resending rate are explained as the first to fourth indexes. However, each of the example embodiments is not limited to these indexes. In the management systems 100, 400, and 800, the following indexes can be used instead of a received light intensity or a resending rate.

For example, the acquiring means 101, 401, and 801 may acquire, as the first index, the quality of the first upward light signal which is received by the upper free-space optical communication apparatus 10 and the light sending direction of which is different from a reference direction.

The reference direction refers to the light sending direction of the first upward light signal that is sent by the lower free-space optical communication apparatus 11 such that the first upward light signal is received at or in the vicinity of the center of the light receiving section 10b of the upper free-space optical communication apparatus 10. The first upward light signal the light sending direction of which is different from the reference direction is received in the peripheral part of the light receiving section 10b. Thus, the light receiving section 10b receives only a portion of the first upward light signal in some cases.

In this context, when the light sending and receiving window 12 of the lower free-space optical communication apparatus 11 is contaminated, the intensity of the first upward light signal is weakened. Thus, in a case where the first upward light signal is received at or in the vicinity of the center of the light receiving section 10b, the first upward light signal is normally received, but in a case where the first upward light signal is received in the peripheral part of the light receiving section 10b and the light receiving section 10b therefore receives only a portion of the first upward light signal, the first upward light signal cannot be normally received in some cases.

Accordingly, the quality of the first upward light signal the light sending direction of which is different from the reference direction varies due to the contamination of the light sending and receiving window 12 of the lower free-space optical communication apparatus 11. Thus, the quality of the first upward light signal which is received by the upper free-space optical communication apparatus 10 and the light sending direction of which is different from the reference direction can be used as the first index.

In an example aspect, the determining means 102, 402, and 802 may determine that the possibility of contamination of the light sending and receiving window 12 is high in a case where the first index does not meet a predetermined condition. In an example aspect, the acquiring means 101, 401, and 801 may acquire, as the first indexes, the qualities of the first upward light signals the respective light sending directions of which are different from each other and different from the reference direction, and the determining means 102, 402, and 802 may determine the possibility of contamination of the light sending and receiving window 12 according to the range of the light sending directions that provide the first indexes that meet the predetermined condition.

As described above, when the light sending and receiving window 12 of the lower free-space optical communication apparatus 11 is contaminated, the intensities of the first upward light signals are weakened. This narrows the range in which the first upward light signals are normally received by the light receiving section 10b. That is, when the intensities of the first upward light signals are strong, the first upward light signals are normally received even if received in the peripheral part of the light receiving section 10b. However, when the intensities of the first upward light signals are weak, the first upward light signals are not normally received unless received at or in the vicinity of the center of the light receiving section 10b. Thus, the management systems 100, 400, and 800 may acquire the qualities of the first upward light signals which are received by the upper free-space optical communication apparatus 10 and the respective light sending directions of which are different from each other and different from the reference direction, to determine the possibility of contamination of the light sending and receiving window 12 according to the range of the light sending directions that provide the qualities that meet the predetermined condition.

Note that in acquiring, as the first indexes, the qualities of the first upward light signals the respective light sending directions of which are different from each other and different from the reference direction, the acquiring means 101,

401, and 801 may acquire the qualities of the first upward light signals by continuously changing the light sending direction, or may discontinuously acquire the qualities of the first upward light signals the respective light sending directions of which are different from each other.

Figure 11:
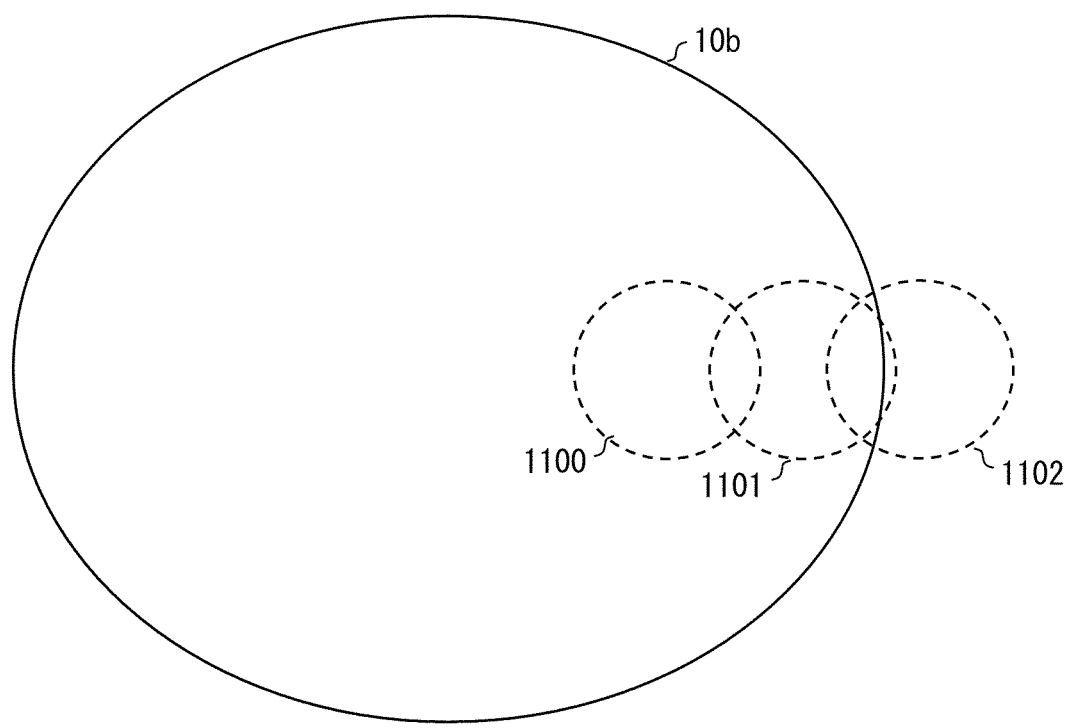
FIG. 11 is an explanatory diagram of a method, in accordance with a fourth example embodiment, for calculating a first index.

One example can be described as follows. As illustrated in FIG. 11, in a case where the light sending directions of the first upward light signals sent from the lower free-space optical communication apparatus 11 are the directions that lead to the reception in a spot 1100 that is near the center of the light receiving section 10*b* of the upper free-space optical communication apparatus 10, all of the first upward light signals are received by the light receiving section 10*b*. However, in a case where the light sending directions of the first upward light signals sent from the lower free-space optical communication apparatus 11 are the directions that lead to the reception in a spot 1101 that is closer to the edge than to the center of the light receiving section 10*b* of the upper free-space optical communication apparatus 10, some of the first upward light signals are not received by the light receiving section 10*b*, and in a case where the light sending directions of the first upward light signals sent from the lower free-space optical communication apparatus 11 are the directions that lead to the reception in a spot 1102 that is even closer to the edge than to the center of the light receiving section 10*b* of the upper free-space optical communication apparatus 10, many more ones of the first upward light signals are not received by the light receiving section 10*b*. Thus, in a case where the first upward light signals are normally received and resending does not occur even when the light sending directions of the first upward light signals sent from the lower free-space optical communication apparatus 11 are the directions that lead to the reception in the spot 1102, the determining means 102, 402, and 802 can determine that the contamination of the light sending and receiving window 12 is mild. In contrast, in a case where the first upward light signals are not normally received and resending occurs even when the light sending directions of the first upward light signals sent from the lower free-space optical communication apparatus 11 are the directions that lead to the reception in the spot 1100, the determining means 102, 402, and 802 can determine that the possibility of the contamination of the light sending and receiving window 12 is high. It is therefore possible to use, as the index for determining the possibility of contamination of the light sending and receiving window 12, the range of the light sending directions of the first upward light signals sent from the lower free-space optical communication apparatus 11, the range meeting a condition of non-occurrence of resending of the first upward light signal. Note that instead of the condition of non-occurrence of resending of the first upward light signal, a condition of received light intensity of the first upward light signal that is greater than a predetermined intensity may be used.

The acquiring means 101, 401, and 801 may be calculate the second to fourth indexes in the same manner.

The present disclosure is not limited to the example embodiments above, but can be altered by a skilled person in the art in various ways. The present disclosure also encompasses, in its technical scope, any example embodiment derived by combining configurations, operations, and processes disclosed in differing example embodiments.

Figure 12:
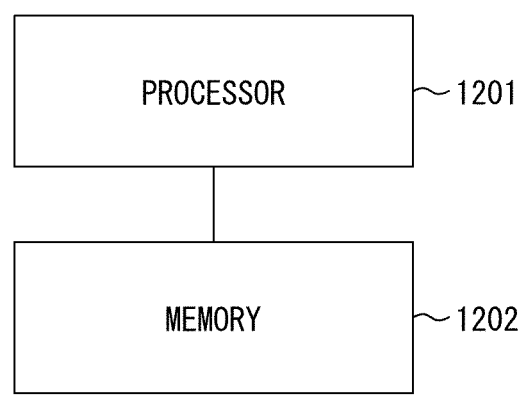
FIG. 12 is a schematic diagram of a configuration of hardware of a computer in accordance with the example embodiments.

Each of the components in accordance with the first to fourth example embodiments may be configured via a single piece of hardware. Each of the components in accordance with the first to fourth example embodiments may be configured via a single piece of software. Each of the components in accordance with the first to fourth example embodiments may be configured via a plurality of pieces of hardware. Each of the components in accordance with the first to fourth example embodiments may be configured via a plurality of pieces of software. The first to fourth example embodiments may be provided by a combination of hardware and software. Each of the functions in accordance with the first to fourth example embodiments may be implemented with use of the cloud. Each apparatus, each function, and each process may be provided with use of a computer including a processor 1201 and a memory 1202 as illustrated in FIG. 12. For example, a program for carrying out the management methods described in the first to fourth example embodiments may be stored in the memory 1202, and the processor 1201 may retrieve and execute the program stored in the memory 1202 so that the functions described in the first to fourth example embodiments may be provided.

The program contains a set of instructions for, when the program is loaded into the computer, causing the computer to carry out one or more of the functions described in the first to fourth example embodiments. The program is stored in the memory 1202. Examples of the processor 1201 can encompass a central processing unit (CPU). Examples of the memory 1202 can encompass a read only memory (ROM), a random access memory (RAM), a flash memory, and a solid state drive (SSD).

The present disclosure is not limited to the example embodiments above. That is, the present invention can apply, within the scope of the present disclosure, various example aspects that could be understood by a person skilled in the art. All or some of the example embodiments above can also be described as below. Note, however, that the present invention is not limited to the following example aspects.

[Supplementary Note 1]

A management system for managing an upper free-space optical communication apparatus and a lower free-space optical communication apparatus that carry out free-space optical communication in an up-and-down direction, the management system comprising: an acquiring means for acquiring a first index that indicates a quality of a first upward light signal received by the upper free-space optical communication apparatus; and a determining means for determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

[Supplementary Note 2]

The management system described in supplementary note 1, in which the acquiring means is configured to further acquire a second index that indicates a quality of a first downward light signal received by the lower free-space optical communication apparatus, and the determining means is configured to determine the possibility of the contamination of the light sending and receiving window by comparing the first index with the second index.

[Supplementary Note 3]

The management system described in supplementary note 1, in which: the upper free-space optical communication apparatus is configured to receive the first upward light signal via a first path; and the acquiring means is configured to further acquire a third index that indicates a quality of a second upward light signal received by the upper free-space optical communication apparatus via a second path, the second path being different from the first path, and the determining means is configured to determine the possibility of the contamination of the light sending and receiving window in accordance with the first index and the third index.

[Supplementary Note 4]

The management system described in supplementary note 3, in which the second path contains a point at which the second upward light signal is reflected by a mirror

[Supplementary Note 5]

The management system described in supplementary note 3 or 4, in which the acquiring means is configured to further acquire a second index that indicates a quality of a first downward light signal received by the lower free-space optical communication apparatus via the first path and a fourth index that indicates a quality of a second downward light signal received by the lower free-space optical communication apparatus via the second path, and the determining means is configured to determine the possibility of the contamination of the light sending and receiving window in accordance with a result of comparison between the first index and the second index and a result of comparison between the third index and the fourth index.

[Supplementary Note 6]

The management system described in supplementary note 1, in which the acquiring means is configured to acquire, as the first index, a quality of the first upward light signal which is received by the upper free-space optical communication apparatus and a light sending direction of which is different from a reference direction.

[Supplementary Note 7]

A management apparatus for managing an upper free-space optical communication apparatus and a lower free-space optical communication apparatus that carry out free-space optical communication in an up-and-down direction, the management apparatus including: an acquiring section for acquiring a first index that indicates a quality of a first upward light signal received by the upper free-space optical communication apparatus; and a determining section for determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

[Supplementary Note 8]

The management apparatus described in supplementary note 7, in which the acquiring section is configured to further acquire a second index that indicates a quality of a first downward light signal received by the lower free-space optical communication apparatus, and the determining section is configured to determine the possibility of the contamination of the light sending and receiving window by comparing the first index with the second index.

[Supplementary Note 9]

The management apparatus described in supplementary note 7, in which: the upper free-space optical communication apparatus is configured to receive the first upward light signal via a first path; and the acquiring section is configured to further acquire a third index that indicates a quality of a second upward light signal received by the upper free-space optical communication apparatus via a second path, the second path being different from the first path, and the determining section is configured to determine the possibility of the contamination of the light sending and receiving window in accordance with the first index and the third index.

[Supplementary Note 10]

The management apparatus described in supplementary note 9, in which the second path contains a point at which the second upward light signal is reflected by a mirror

[Supplementary Note 11]

The management apparatus described in supplementary note 9 or 10, in which the acquiring section is configured to further acquire a second index that indicates a quality of a first downward light signal received by the lower free-space optical communication apparatus via the first path and a fourth index that indicates a quality of a second downward light signal received by the lower free-space optical communication apparatus via the second path, and the determining section is configured to determine the possibility of the contamination of the light sending and receiving window in accordance with a result of comparison between the first index and the second index and a result of comparison between the third index and the fourth index.

[Supplementary Note 12]

The management apparatus described in supplementary note 7, in which the acquiring section is configured to acquire, as the first index, a quality of the first upward light signal which is received by the upper free-space optical communication apparatus and a light sending direction of which is different from a reference direction.

[Supplementary Note 13]

A management method for managing an upper free-space optical communication apparatus and a lower free-space optical communication apparatus that carry out free-space optical communication in an up-and-down direction, the management method including: acquiring a first index that indicates a quality of a first upward light signal received by the upper free-space optical communication apparatus; and determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

[Supplementary Note 14]

The management method described in supplementary note 13, in which a second index that indicates a quality of a first downward light signal received by the lower free-space optical communication apparatus is further acquired, and by comparing the first index with the second index, the possibility of the contamination of the light sending and receiving window is determined.

[Supplementary note 15]

The management method described in supplementary note 13, in which: the upper free-space optical communication apparatus is configured to receive the first upward light signal via a first path; a third index that indicates a quality of a second upward light signal received by the upper free-space optical communication apparatus via a second path is further acquired, the second path being different from the first path; and the possibility of the contamination of the light sending and receiving window is determined in accordance with the first index and the third index.

[Supplementary Note 16]

The management method described in supplementary note 15, in which the second path contains a point at which the second upward light signal is reflected by a mirror

[Supplementary Note 17]

The management method described in supplementary note 15 or 16, in which a second index that indicates a quality of a first downward light signal received by the lower free-space optical communication apparatus via the first path and a fourth index that indicates a quality of a second downward light signal received by the lower free-space optical communication apparatus via the second path are further acquired, and the possibility of the contamination of the light sending and receiving window is determined in accordance with a result of comparison between the first index and the second index and a result of comparison between the third index and the fourth index.

[Supplementary Note 18]

The management method described in supplementary note 13, in which a quality of the first upward light signal which is received by the upper free-space optical communication apparatus and a light sending direction of which is different from a reference direction is acquired as the first index.

REFERENCE SIGNS LIST

10: Upper free-space optical communication apparatus
10a, 11a: Sending section
10b, 11b: Receiving section
10c, 11c: Communication control section
11: Lower free-space optical communication apparatus
12, 13: Sending and receiving window
12a, 13a: Sending section window
12b, 13b: Receiving section window
80: Mirror
81: First path
82: Second path
100, 400, 800: Management system
101, 401, 801: Acquiring means
102, 402, 802: Determining means
300: Management apparatus
301: Acquiring section
302: Determining section
1201: Processor
1202: Memory

The invention claimed is:

1. A management system for managing an upper free-space optical communication apparatus and a lower free-space optical communication apparatus that carry out free-space optical communication in an up-and-down direction, the management system comprising:
at least one processor,
the at least one processor carrying out:
an acquisition process of acquiring a first index that indicates a quality of a first upward light signal received by the upper free-space optical communication apparatus; and
a determination process of determining, in accordance with the first index, a possibility of contamination of a light sending and receiving window of the lower free-space optical communication apparatus,
the lower free-space optical communication apparatus being configured to send and receive a light signal of the free-space optical communication through the light sending and receiving window.

2. The management system according to claim 1, wherein the at least one processor
further acquires, in the acquisition process, a second index that indicates a quality of a first downward light signal received by the lower free-space optical communication apparatus, and
determines, in the determination process, the possibility of the contamination of the light sending and receiving window by comparing the first index with the second index.

3. The management system according to claim 1, wherein:
the upper free-space optical communication apparatus is configured to receive the first upward light signal via a first path; and
the at least one processor
further acquires, in the acquisition process, a third index that indicates a quality of a second upward light signal received by the upper free-space optical communication apparatus via a second path, the second path being different from the first path, and
determines, in the determination process, the possibility of the contamination of the light sending and receiving window in accordance with the first index and the third index.

4. The management system according to claim 3, wherein the second path contains a point at which the second upward light signal is reflected by a mirror.

5. The management system according to claim 3, wherein the at least one processor
further acquires, in the acquisition process, a second index that indicates a quality of a first downward light signal received by the lower free-space optical communication apparatus via the first path and a fourth index that indicates a quality of a second downward light signal received by the lower free-space optical communication apparatus via the second path, and
determines, in the determination process, the possibility of the contamination of the light sending and receiving window in accordance with a result of comparison between the first index and the second index and a result of comparison between the third index and the fourth index.

6. The management system according to claim 1, wherein in the acquisition process, the at least one processor acquires, as the first index, a quality of the first upward light signal which is received by the upper free-space optical communication apparatus and a light sending direction of which is different from a reference direction.

7. A management apparatus for managing an upper free-space optical communication apparatus and a lower free-space optical communication apparatus that carry out free-space optical communication in an up-and-down direction, the management apparatus comprising
at least one processor,
the at least one processor carrying out:
an acquisition process of acquiring a first index that indicates a quality of a first upward light signal received by the upper free-space optical communication apparatus; and
a determination process of determining, in accordance with the first index, a possibility of contamination of a light sending and receiving window of the lower free-space optical communication apparatus,
the lower free-space optical communication apparatus being configured to send and receive a light signal of the free-space optical communication through the light sending and receiving window.

8. The management apparatus according to claim 7, wherein the at least one processor further acquires, in the acquisition process, a second index that indicates a quality of a first downward light signal received by the lower free-space optical communication apparatus, and determines, in the determination process, the possibility of the contamination of the light sending and receiving window by comparing the first index with the second index.

9. The management apparatus according to claim 7, wherein:

the upper free-space optical communication apparatus is configured to receive the first upward light signal via a first path; and the at least one processor further acquires, in the acquisition process, a third index that indicates a quality of a second upward light signal received by the upper free-space optical communication apparatus via a second path, the second path being different from the first path, and determines, in the determination process, the possibility of the contamination of the light sending and receiving window in accordance with the first index and the third index.

10. The management apparatus according to claim 9, wherein the second path contains a point at which the second upward light signal is reflected by a mirror.

11. The management apparatus according to claim 9, wherein the at least one processor further acquires, in the acquisition process, a second index that indicates a quality of a first downward light signal received by the lower free-space optical communication apparatus via the first path and a fourth index that indicates a quality of a second downward light signal received by the lower free-space optical communication apparatus via the second path, and determines, in the determination process, the possibility of the contamination of the light sending and receiving window in accordance with a result of comparison between the first index and the second index and a result of comparison between the third index and the fourth index.

12. The management apparatus according to claim 7, wherein in the acquisition process, the at least one processor acquires, as the first index, a quality of the first upward light signal which is received by the upper free-space optical communication apparatus and a light sending direction of which is different from a reference direction.

13. A management method for managing an upper free-space optical communication apparatus and a lower free-space optical communication apparatus that carry out free-space optical communication in an up-and-down direction, the management method comprising:

acquiring a first index that indicates a quality of a first upward light signal received by the upper free-space optical communication apparatus; and determining, in accordance with the first index, a possibility of contamination of a light sending and receiving window of the lower free-space optical communication apparatus, the lower free-space optical communication apparatus being configured to send and receive a light signal of the free-space optical communication through the light sending and receiving window.

14. The management method according to claim 13, wherein a second index that indicates a quality of a first downward light signal received by the lower free-space optical communication apparatus is further acquired, and by comparing the first index with the second index, the possibility of the contamination of the light sending and receiving window is determined.

15. The management method according to claim 13, wherein:

the upper free-space optical communication apparatus is configured to receive the first upward light signal via a first path;

a third index that indicates a quality of a second upward light signal received by the upper free-space optical communication apparatus via a second path is further acquired, the second path being different from the first path; and the possibility of the contamination of the light sending and receiving window is determined in accordance with the first index and the third index.

16. The management method according to claim 15, wherein the second path contains a point at which the second upward light signal is reflected by a mirror.

17. The management method according to claim 15, wherein a second index that indicates a quality of a first downward light signal received by the lower free-space optical communication apparatus via the first path and a fourth index that indicates a quality of a second downward light signal received by the lower free-space optical communication apparatus via the second path are further acquired, and the possibility of the contamination of the light sending and receiving window is determined in accordance with a result of comparison between the first index and the second index and a result of comparison between the third index and the fourth index.

18. The management method according to claim 13, wherein a quality of the first upward light signal which is received by the upper free-space optical communication apparatus and a light sending direction of which is different from a reference direction is acquired as the first index.

* * * * *